(12) United States Patent
Kihara et al.

(10) Patent No.: US 10,378,973 B2
(45) Date of Patent: Aug. 13, 2019

(54) DEVICE FOR DETECTING HOLDING STATE OF AN OBJECT

(71) Applicant: Murata Manufacturing Co., Ltd., Nagaokakyo-shi, Kyoto-fu (JP)

(72) Inventors: Takashi Kihara, Nagaokakyo (JP); Masamichi Ando, Nagaokakyo (JP); Hiroaki Kitada, Nagaokakyo (JP); Jun Endo, Nagaokakyo (JP); Yoshihiro Yamaguchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 267 days.

(21) Appl. No.: 15/454,155

(22) Filed: Mar. 9, 2017

(65) Prior Publication Data

US 2017/0176268 A1 Jun. 22, 2017

Related U.S. Application Data

(63) Continuation of application No. PCT/JP2015/066350, filed on Jun. 5, 2015.

(30) Foreign Application Priority Data

Sep. 12, 2014 (JP) ................. 2014-185888

(51) Int. Cl.
*G01L 1/16* (2006.01)
*G06F 3/0354* (2013.01)
*G01L 1/22* (2006.01)

(52) U.S. Cl.
CPC .............. *G01L 1/16* (2013.01); *G01L 1/2287* (2013.01); *G06F 3/03545* (2013.01)

(58) Field of Classification Search
CPC ...................................... G01L 1/16
(Continued)

(56) References Cited

U.S. PATENT DOCUMENTS 5,134,348 A * 7/1992 Izukawa ................. H02N 2/14
310/116
2010/0253183 A1* 10/2010 Ando ........................ G01L 1/16
310/338

(Continued)

FOREIGN PATENT DOCUMENTS

CN 203386200 U 1/2014
JP H10-269007 A 10/1998

(Continued)

OTHER PUBLICATIONS

Takagi. Translation of JPH10269007. Pub. Oct. 1998 Translated Dec. 2018. (Year: 1998).*

(Continued)

*Primary Examiner* — Walter L Lindsay, Jr.
*Assistant Examiner* — Philipmarcus T Fadul
(74) *Attorney, Agent, or Firm* — Arent Fox LLP

(57) ABSTRACT

A device for detecting a holding state of an object. The device includes a housing for the object that has a shape that can be held by an operator and a piezoelectric sensor attached to the housing. Moreover, a detecting unit can detects a holding state of the housing by using a fluctuation amount of an output voltage of the piezoelectric sensor. The housing has a shape having a hollow space and the piezoelectric sensor has a flat film shape and is disposed in contact with an inner wall surface of the housing. The piezoelectric film produces charges when stretched and contracted in response to a displacement of the housing that are outputted as a voltage to the detecting unit. When detecting that the output voltage significantly fluctuates, the detecting unit identifies that the object is being held.

18 Claims, 15 Drawing Sheets

(58) Field of Classification Search
USPC .................................................. 73/862.625
See application file for complete search history.

(56) References Cited

U.S. PATENT DOCUMENTS

| | | |
|---|---|---|
| 2014/0078117 A1 | 3/2014 | Asano |
| 2015/0042590 A1* | 2/2015 | Ando .................. G06F 3/0354 |
| | | 345/173 |

FOREIGN PATENT DOCUMENTS

| | | |
|---|---|---|
| JP | 2004-284341 A | 10/2004 |
| JP | 2009-211552 A | 9/2009 |
| JP | 2012-63844 A | 3/2012 |
| JP | 2013-242819 A | 12/2013 |
| JP | 2014-62962 A1 | 4/2014 |
| WO | WO 2013/161784 A1 | 10/2013 |

OTHER PUBLICATIONS

Sakiko et al. Translation of JP2013242819 . Pub. Dec. 2013. Translated Dec. 2018. (Year: 2013).*
International Search Report issued in International Application No. PCT/JP2015/066350, dated Jul. 7, 2015.
Written Opinion of the International Searching Authority issued in International Application No. PCT/JP2015/066350, dated Jul. 7, 2015.

* cited by examiner

DEVICE FOR DETECTING HOLDING STATE OF AN OBJECT

CROSS REFERENCE TO RELATED APPLICATIONS

The present application is a continuation of PCT/JP2015/066350 filed Jun. 5, 2015, which claims priority to Japanese Patent Application No. 2014-185888, filed Sep. 12, 2014, the entire contents of each of which are incorporated herein by reference.

TECHNICAL FIELD

The present disclosure relates to a holding state detecting device that can detect when a person holds a detection target object.

BACKGROUND ART

Currently, various electronic writing tools (digital pens) are put into practical use. For example, an electronic writing tool disclosed in Patent Document 1 (identified below) includes a tact switch that is disposed in a housing, and an operation button that protrudes to an outside of the housing. When an operator presses the operation button, a bottom surface of the operation button presses the tact switch. The tact switch is switched to an on state by this press. Thus, the device can detect that the operator is operating the electronic writing tool.

Patent Document 1: Japanese Patent Application Laid Open No. 2009-211552.

However, the electronic writing tool disclosed in Patent Document 1 uses an automatic switch, i.e., a mechanical switch, and therefore, a contact failure can occur due to a damage or temporal deterioration. Further, unless the operation button is reliably pressed by the operator with sufficient force and is brought in contact with the tact switch, the device will not reliably detect a holding state.

SUMMARY OF THE INVENTION

Therefore, according to the present disclosure, a reliable holding state detecting device is provided that can detect a holding state of an object without gaining an operator's attention.

A holding state detecting device is disclosed that includes a housing which has a shape which an operator can hold; a piezoelectric sensor which is attached to the housing; and a detecting unit which detects a holding state of the housing by using a fluctuation amount of an output voltage of the piezoelectric sensor.

According to this configuration, a fluctuation in the force applied to the housing when the operator holds the housing directly and instantaneously appears as a fluctuation of the output voltage of the piezoelectric sensor. Consequently, by detecting this fluctuation of the output voltage, it is possible to directly and instantaneously detect the holding state of the housing. Further, the piezoelectric film detects the fluctuation, so that a mechanical operation unit is not necessary.

Furthermore, preferably, the piezoelectric sensor of the holding state detecting device includes a piezoelectric film of a flat film shape, and a conductor film which extracts a charge produced by the piezoelectric film when the piezoelectric film is stretched and contracted in response to a displacement of the housing. The charges are outputted as a voltage to the detecting unit by the detection conductors.

According to this configuration, it is possible to make the piezoelectric sensor thin, and easily attach the piezoelectric sensor to the housing.

Further, preferably, the piezoelectric film of the holding state detecting device contains polylactic acid as a main component, and is stretched in a uniaxial direction.

According to this configuration, it is possible to accurately detect the holding state irrespectively of an influence of pyroelectricity.

Further, preferably, in the holding state detecting device, the housing has one of a cylindrical shape and a box shape, and the piezoelectric sensor is attached to an inner wall surface of the housing.

According to this configuration, the operator does not need to directly touch the piezoelectric sensor, and it is possible to accurately detect the holding state.

Further, preferably, when the fluctuation amount is detected to be larger than a preset threshold, the detecting unit of the holding state detecting device determines that the housing is being held.

According to this configuration, it is possible to accurately detect that the housing is held.

Further, preferably, when the fluctuation amount is detected to become equal to or less than the threshold after the fluctuation amount becomes larger than the threshold, the detecting unit of the holding state detecting device identifies that the housing is released from being held.

According to this configuration, it is possible to accurately detect that the housing is released from being held.

Further, when the output voltage is detected to be larger than a preset operation control threshold, the detecting unit of the holding state detecting device may perform control to start an operation executed by the holding state detecting device.

According to this configuration, it is possible to detect the holding state, and receive an input of an operation different from detection of the holding state performed by the holding state detecting device.

Further, when the output voltage is detected to be larger than a preset first operation control threshold, and then the output voltage is detected to be smaller than a preset second operation control threshold, the detecting unit of the holding state detecting device may perform control to start an operation executed by the holding state detecting device.

According to this configuration, it is possible to detect the holding state, and receive an input of an operation different from detection of the holding state performed by the holding state detecting device.

Further, the holding state detecting device may employ differing configurations. For example, the detecting unit disclosed herein can detect a time at which the output voltage becomes maximal, then detect a time at which the output voltage becomes minimal and calculate a time interval between the times. When detecting that the time interval is longer than an operation control three threshold, the detecting unit performs control to start an operation executed by the holding state detecting device.

According to this configuration, it is possible to detect the holding state, and receive an input of an operation different from detection of the holding state performed by the holding state detecting device.

According to the present disclosure, it is possible to provide a reliable holding state detecting device that can detect a holding state without gaining an operator's attention.

DETAILED DESCRIPTION OF THE EXEMPLARY EMBODIMENTS

Figure 1A:
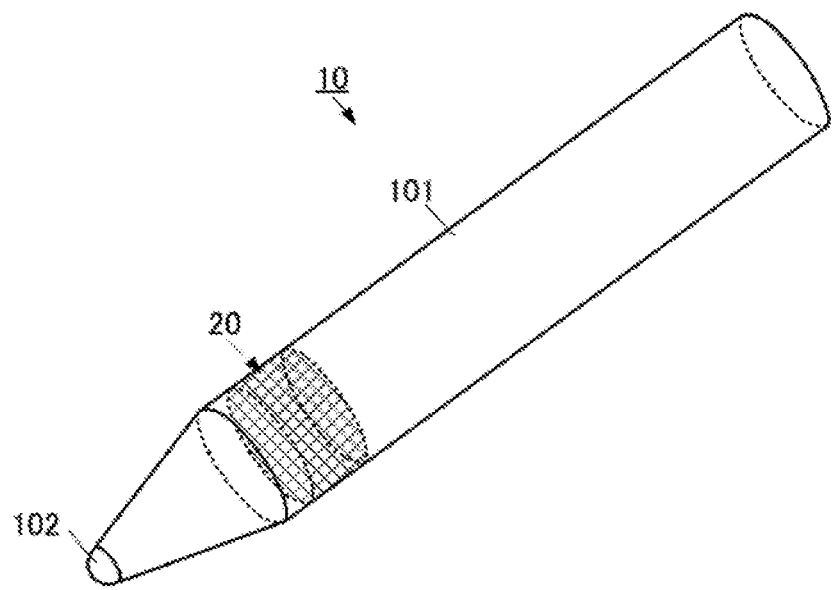
FIG. 1(A) is a perspective view and FIG. 1(B) is a sectional view of a holding state detecting device according to a first embodiment.
Figure 1B:
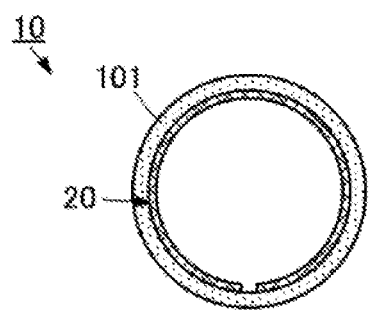
Figure 2:
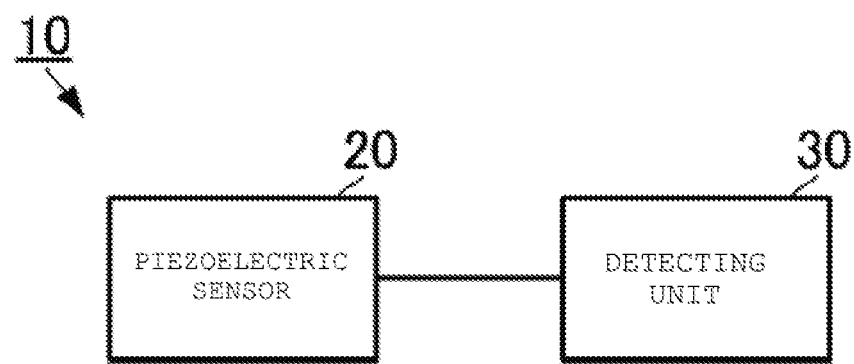
FIG. 2 is a functional block diagram of a holding state detecting device according to the first embodiment.

A holding state detecting device according to the first embodiment will be described with reference to the drawings. FIG. 1(A) is a perspective view of the holding state detecting device according to the first embodiment. FIG. 1(B) is a sectional view of the holding state detecting device according to the first embodiment. FIG. 1(B) is the sectional view of an area of the holding state detecting device to which a piezoelectric sensor is attached. FIG. 2 is a functional block diagram of the holding state detecting device according to the first embodiment. In the present embodiment, the holding state detecting device having a shape of an electronic writing tool will be described as an example.

As illustrated in FIG. 1, a holding state detecting device 10 includes a piezoelectric sensor 20 and a housing 101 of an object, such as an electronic writing tool. Further, as illustrated in FIG. 2, the holding state detecting device 10 includes the piezoelectric sensor 20 and a detecting unit 30. The piezoelectric sensor 20 and the detecting unit 30 are connected to each other. The detecting unit 30 detects an output voltage of the piezoelectric sensor 20, and detects whether or not an operator is holding the housing 101 of the object. In this regard, although not illustrated in FIG. 1, the detecting unit 30 may be attached inside the object's housing 101 or may be disposed outside the housing 101 of the object. According to an aspect where the detecting unit 30 is disposed outside the housing 101, the piezoelectric sensor 20 and the detecting unit 30 need to be connected via a wire or wirelessly.

As shown in the exemplary embodiment, the housing 101 of the object has a cylindrical shape and has a hollow space. The housing 101 is made of an insulation material. One end of the housing 101 in a longitudinal direction (a direction orthogonal to a circumferential direction) includes a tapered end 102.

When this holding state detecting device 10 is used as the electronic writing tool, the operator can handle or hold the holding state detecting device 10 as follows. The operator holds a cylindrical portion of the housing 101, and brings the tapered end 102 in contact with another electronic device (e.g. electronic blackboard). When the operator moves the holding state detecting device 10, a distal end of the tapered end 102 also moves. Another electronic device mentioned above senses this movement and receives an operator's operation input.

The piezoelectric sensor 20 is a flat film having flexibility, and is disposed on an inner surface wall of the housing 101 as illustrated in FIG. 1(B). In this regard, the piezoelectric sensor 20 is disposed along the circumferential direction on the inner wall surface.

The piezoelectric sensor 20 includes a piezoelectric film of a flat film shape and detection conductors. The detection conductors are formed on two opposite flat film surfaces of the piezoelectric film. The detection conductors are connected to the detecting unit 30.

The piezoelectric film is a piezoelectric material which produces charges in the flat film surfaces being opposite when stretched and contracted. For example, the piezoelectric film is made of uniaxially stretched polylactic acid (PLA), and, mere specifically, poly-L-lactic-acid (PLLA). A uniaxial stretching direction of polylactic acid is a direction which forms approximately 45° with respect to the longitudinal direction of the piezoelectric film. In this regard, this formed angle is the most preferably 45° yet may be in a range of approximately ±10°. In this regard, the longitudinal direction of the piezoelectric film is the circumferential direction along the inner surface wall of the housing 101 in an example in FIG. 1.

Hereinafter, characteristics of PLLA for forming a piezoelectric sheet 21 will be described.

PLLA is made of chiral polymer. PLLA has a main chain of a helical structure. When molecules are oriented in a direction in which PLLA is uniaxially stretched, PLLA has piezoelectricity in response to the orientation of the molecules. Further, the uniaxially stretched PLLA produces charges when the piesoelectric film is stretched. A charge amount to be produced is determined based on a stretch amount of the piezoelectric film. A piezoelectric constant of the uniaxially stretched PLLA belongs to a group of very high piezoelectric constants among polymers. For example, a piezoelectric distortion constant $d_{14}$ of PLLA can take a high value such as 10 to 20 pC/N by controlling stretching conditions, heat processing conditions and conditions relating to additive mixing.

Further, according to an aspect where the direction in which the piezoelectric film stretches and the uniaxial stretching direction forms an angle of 45°, it is possible to effectively produce charges.

In this regard, a stretching ratio of the piezoelectric film is preferably approximately three to eight times. By performing heating treatment after performing stretching, crystallization of extended chain crystal of polylactic acid is accelerated, and the piezoelectric constant improves. In this regard, when biaxial stretching is performed, it is possible to provide the same effect as that of uniaxial stretching by employing different stretching ratios for respective axes. When, for example, a given direction is an X axis, the film is stretched eight times in an X axis direction, and the film is stretched twice in a Y axis direction orthogonal to the X axis, it is possible to provide substantially the same effect in terms of the piezoelectric constant as an effect obtained when the film is uniaxially stretched four times in the X axis direction. Simply uniaxially stretched piezoelectric film is likely to break in a stretching axial direction. Consequently, by performing biaxial stretching as described above, it is possible to increase the strength to some degree.

Further, PLLA exhibits piezoelectricity as a result of molecular orientation treatment by stretching, and does not need to be subjected to poling treatment unlike other polymers such as PVDF or piezoelectric ceramics. That is, the piezoelectricity of PLLA which does not belong to ferroelectrics is exhibited not by ion polarization as in ferroelectrics such as PVDF or PZT, but derives from a helical structure which is a characteristic structure of molecules. Further, PLLA does not exhibit pyroelectricity unlike other ferroelectric piezoelectric bodies. Furthermore, although PVDF or the like shows a fluctuation of a piezoelectric constant over time and the piezoelectric constant significantly lowers in some cases, a piezoelectric constant of PLLA is very stable over time. Hence, an output charge amount is not influenced by a duration of a use time and a surrounding environment.

Thus, by using the uniaxially stretched PLLA for the piezoelectric film in this way, it is possible to prevent an influence of a temperature change caused when the operator holds the housing 101, and realize the reliable piezoelectric sensor 20. Further, even a little displacement of the housing 101 caused when the operator holds the housing 101 produces charges, so that it is possible to detect that the operator holds the housing 101, i.e., it is possible to detect a holding stare of the housing 101 with a high sensitivity.

Figure 3:
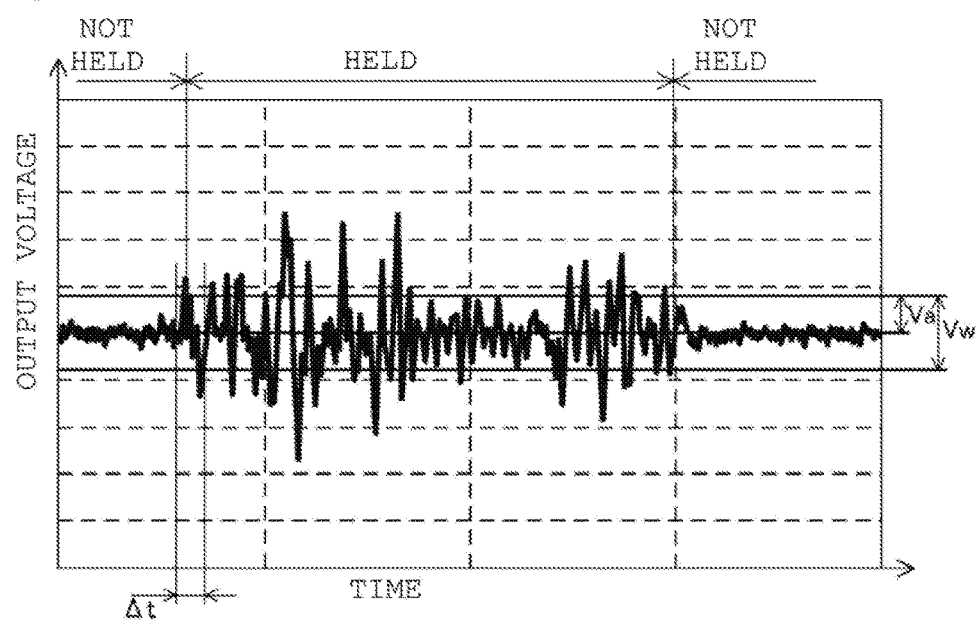
FIG. 3 is a graph illustrating an output voltage of a piezoelectric sensor of the holding state detecting device according to the first embodiment.

FIG. 3 is a graph illustrating an output voltage of the piezoelectric sensor of the holding state detecting device according to the first embodiment. As illustrated in FIG. 3, in a period in which the housing 101 is not held, a voltage fluctuates little and a fluctuation amount is a very little. By contrast with this, in a period in which the housing 101 is held, the voltage significantly fluctuates, and the fluctuation amount is great.

Figure 4:
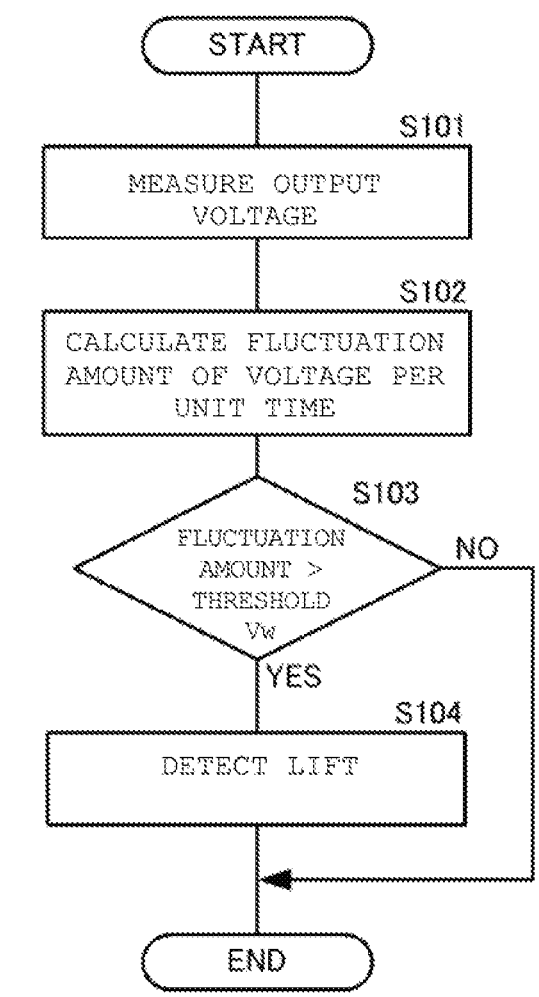
FIG. 4 is a flowchart illustrating a holding state detection flow of the holding state detecting device according to the first embodiment.

Consequently, the detecting unit 30 can detect that the housing 101 is held by executing the following flow. FIG. 4 is a flowchart illustrating the holding state detection flow of the holding state detecting device according to the first embodiment.

The detecting unit 30 measures an output voltage of the piezoelectric sensor 20 (S101). The detecting unit 30 calculates a fluctuation amount of the output voltage per preset measurement unit time (S102). The fluctuation amount refers to, for example, a difference between a maximum voltage and a minimum voltage in the measurement unit time.

The detecting unit 30 compares the fluctuation amount and a threshold voltage (hold detection threshold) Vw. When detecting that the fluctuation amount is larger than the threshold voltage Vw (S103: YES), the detecting unit 30 identifies that the housing 101 is held (lifted) (S104). When the fluctuation amount is equal to or less than the threshold voltage Vw (S103: NO), the detecting unit 30 identifies that the housing 101 is not held. Further, the detecting unit 30 continues measuring the output voltage, calculates the fluctuation amount per unit time and compares the fluctuation amount and the threshold. In general, each threshold voltage described herein can be preset and stored in electronic memory (not shown) of the holding state detecting device 10. In one aspect, the preset voltage is predetermined by the device manufacturer and stored in the memory for subsequent reference during operation as described herein.

Consequently, the holding state detecting device 10 can detect that the housing 101 is held.

Figure 5:
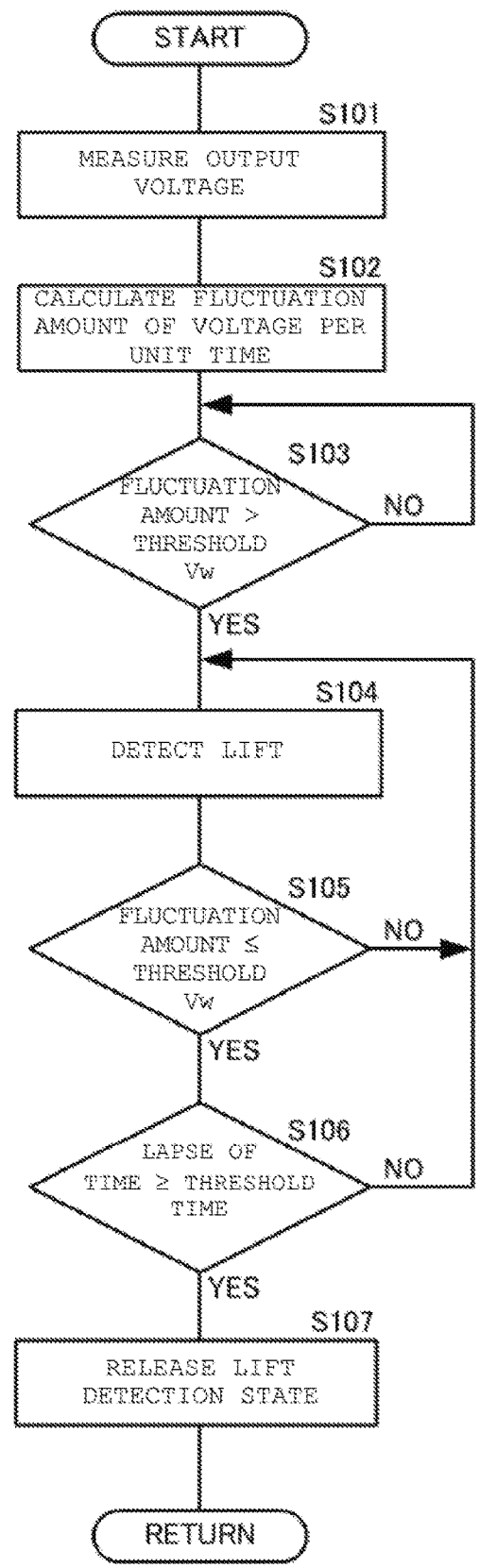
FIG. 5 is a flowchart illustrating a holding state detection flow of the holding state detecting device according to the first embodiment.

Further, the detecting unit 30 can detect a holding state of the housing 101 by executing the following flow. FIG. 5 is a flowchart illustrating a holding state detection flow of the holding state detecting device according to the first embodiment. In this regard, steps up to step S104 of detecting a holding state in FIG. 5 are the same as described above with respect to FIG. 4, and therefore will not be described.

The detecting unit 30 continues comparing the fluctuation amount and the threshold Vw, and continues identifying that the housing 101 is held in a period in which the fluctuation amount is not equal to or less than the threshold Vw (S105: NO).

When detecting that the fluctuation amount is equal to or less than the threshold Vw (S105: YES), the detecting unit 30 starts measuring a time. The detecting unit 30 measures as a lapse of time a time during which the fluctuation amount continues to be equal to or less than the threshold Vw based on a timing at which it is detected that the fluctuation amount is equal to or less than the threshold Vw. The detecting unit 30 continues identifying that the housing 101 is held in a period in which the lapse of time is shorter than a threshold time (S106: NO).

When the lapse of time reaches the threshold time, the detecting unit 30 identifies that the housing 101 is released from being held (lifted) (S107).

Consequently, the detecting unit 30 can detect a holding state of the housing 101 (whether or not the housing 101 is held).

In this regard, the detecting unit 30 may set to a fluctuation amount a difference between a maximum voltage or a minimum voltage in a measurement unit time, and a reference voltage by using an average voltage in a period in which the housing is not held (default state) as the reference voltage. In this case, a threshold Va in FIG. 3 defined by a potential difference from the reference voltage needs to be used.

By employing such a configuration, it is possible to accurately and reliably detect that the operator holds the housing 101. Further, a sensitivity with respect to a displacement of the piezoelectric sensor 20 is high, so that it is possible to instantaneously detect that the housing 101 is held. Furthermore, a mechanical switch is not used, so that a contact failure will not occur due to damage or temporal deterioration and reliability will be high.

Still further, by using such a configuration and processing, it is possible to accurately and reliably detect whether or not the housing is held. Moreover, it is possible to detect a change in the holding state without a time lag.

In addition, by using such a configuration, it is possible to detect that the housing 101 is held when the housing 101 is simply held even though the operator does not operate a switch or the like. That is, it is possible to detect the holding state without gaining an operator's attention.

In this regard, in the present embodiment, an aspect where the piezoelectric sensor 20 is attached near a portion of the housing 101 connected with the tapered end 102 has been described. However, the piezoelectric sensor 20 may be attached to another position of the housing 101. In this regard, by attaching the piezoelectric sensor 20 to a position which the operator can grip the most easily as in the present embodiment, it is possible to more accurately and reliably detect the holding state.

Figure 6:
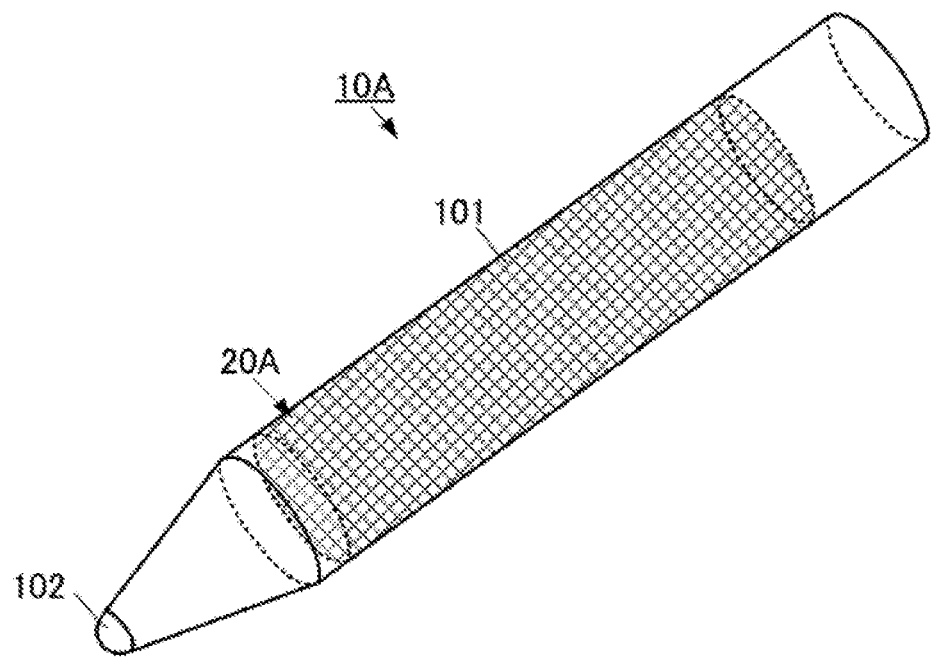
FIG. 6 is a perspective view of a holding state detecting device according to a second embodiment.

Next, a holding state detecting device according to a second embodiment will be described with reference to the drawings. FIG. 6 is a perspective view of the holding state detecting device according to the second embodiment.

A holding state detecting device 10A according to the present embodiment differs from the holding state detecting device 10 according to the first embodiment in an aspect of a shape of a piezoelectric sensor 20A and attachment of the piezoelectric sensor 20A to a housing 101. Other components are the same as those of the holding state detecting device 10 according to the first embodiment.

The piezoelectric sensor 20A has a shape that spreads to an entire circumferential direction of the housing 101 and also in a longitudinal direction of the housing 101. By employing such a configuration, it is possible to accurately and reliably detect a holding state irrespectively of a grip position of the housing 101.

Figure 7:
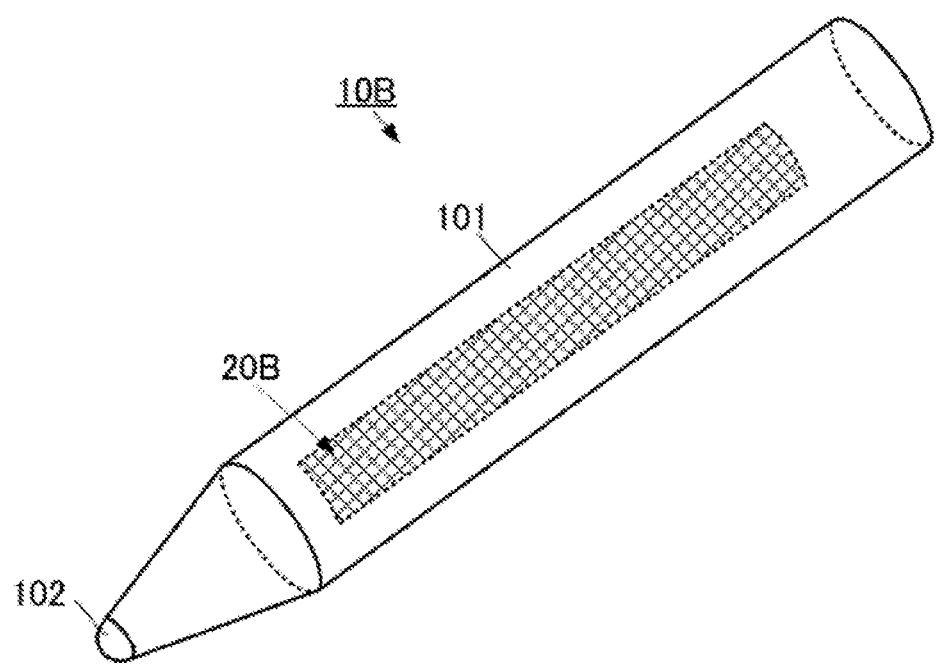
FIG. 7 is a perspective view of a holding state detecting device according to a third embodiment.

Next, a holding state detecting device according to a third embodiment will be described with reference to the drawings. FIG. 7 is a perspective view of the holding state detecting device according to the third embodiment.

A holding state detecting device 10B according to the present embodiment differs from the holding state detecting device 10 according to the first embodiment in an aspect of a shape of a piezoelectric sensor 20B and attachment of the piezoelectric sensor 20B to a housing 101. Other components are the same as those of the holding state detecting device 18 according to the first embodiment.

The piezoelectric sensor 20B is attached to the housing 101 such that a longitudinal direction of the housing 101 and a longitudinal direction of the piezoelectric sensor 20B are parallel. In this configuration, it is possible to accurately and reliably detect a holding state similar to the first and second embodiments. Further, by using this configuration, it is possible to detect the holding state irrespectively of a grip position, and reduce an area of a piezoelectric film. Consequently, it is possible to attach the piezoelectric sensor 20B to the housing 101 at low cost.

Figure 8:
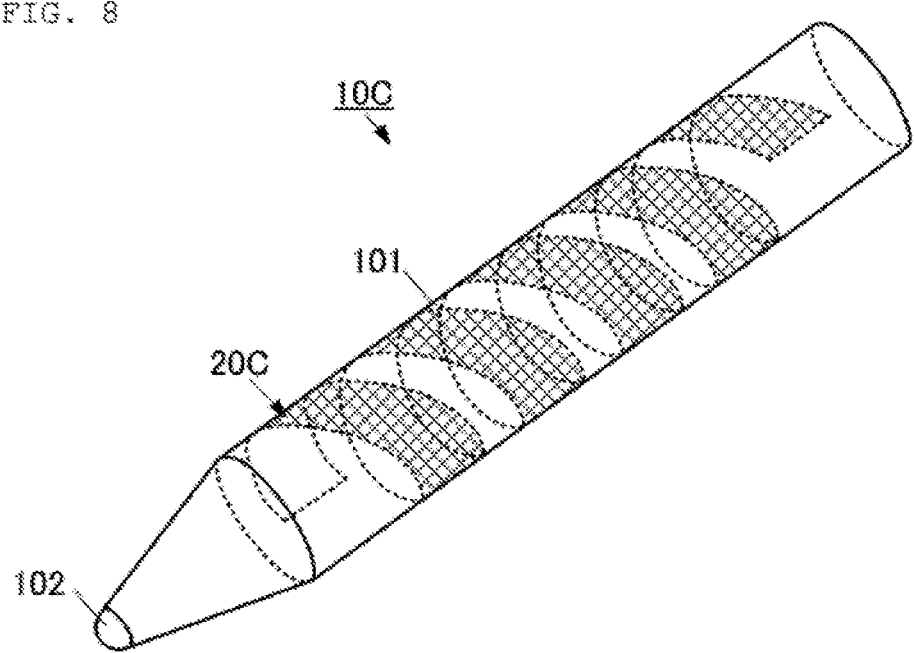
FIG. 8 is a perspective view of a holding state detecting device according to a fourth embodiment.

Next, a holding state detecting device according to a fourth embodiment will be described with reference to the drawings. FIG. 8 is a perspective view of the holding state detecting device according to the fourth embodiment.

A holding state detecting device 10C according to the present embodiment differs from the holding state detecting device 10 according to the first embodiment in an aspect of a shape of a piezoelectric sensor 20C and attachment of the piezoelectric sensor 20C to a housing 101. Other components are the same as those of the holding state detecting device 10 according to the first embodiment.

The piezoelectric sensor 20C has an elongated shape. The piezoelectric sensor 20C is helically attached along a circumferential surface of the housing 101. In this case, a uniaxial stretching direction of a piezoelectric film needs to be a longitudinal direction of the piezoelectric sensor 20C or needs to foe parallel to a lateral direction orthogonal to the longitudinal direction.

In this configuration, it is possible to accurately and reliably detect a holding state irrespectively of a grip position similar to the second embodiment. Further, according to the configuration of the present embodiment, it is possible to reduce an area of the piezoelectric film.

Figure 9:
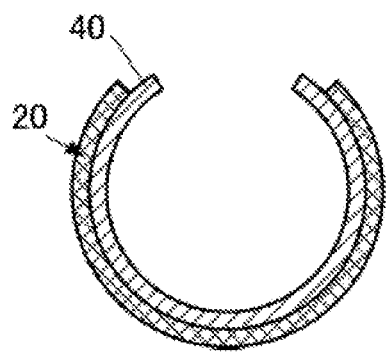
FIG. 9 is a side view illustrating a state where a piezoelectric film is attached to a piezoelectric film attachment jig used for a holding state detecting device according to a fifth embodiment.

Next, a holding state detecting device according to a fifth embodiment will be described with reference to the drawings. FIG. 9 is a side view illustrating a state where a piezoelectric film is attached to a piezoelectric film attachment jig used for a holding state detecting device according to the fifth embodiment.

A basic structure of the holding state detecting device according to the present embodiment is the same as the holding state detecting device according to the first embodiment, and differs in an attachment structure of the piezoelectric sensor 20.

The piezoelectric sensor 20 is attached to a surface of an attachment jig 40 having high elasticity. The attachment jig 40 has a shape which is curved according to a shape of an inner wall surface of the housing 101. The piezoelectric sensor 20 is attached to an outer circumferential surface of the attachment jig 40.

When the piezoelectric sensor 20 is attached inside a housing 101, the attachment jig 40 is inserted to be fit in the housing 101 in a state where the attachment jig 40 is curved more compared to a stationary state. The inserted attachment jig 40 tries to restore to the stationary state, and presses the piezoelectric sensor 20 in a direction toward an inner wall surface of the housing 101. Consequently, it is possible to hold the piezoelectric sensor 20 in contact with the inner wall surface of the housing 101.

By using such a configuration, it is possible to easily attach the piezoelectric sensor 20 to the inner wall surface of the housing 101 compared to a case where the piezoelectric sensor 20 is directly attached to the inner wall surface of the housing 101 by using an adhesive or the like.

Figure 10:
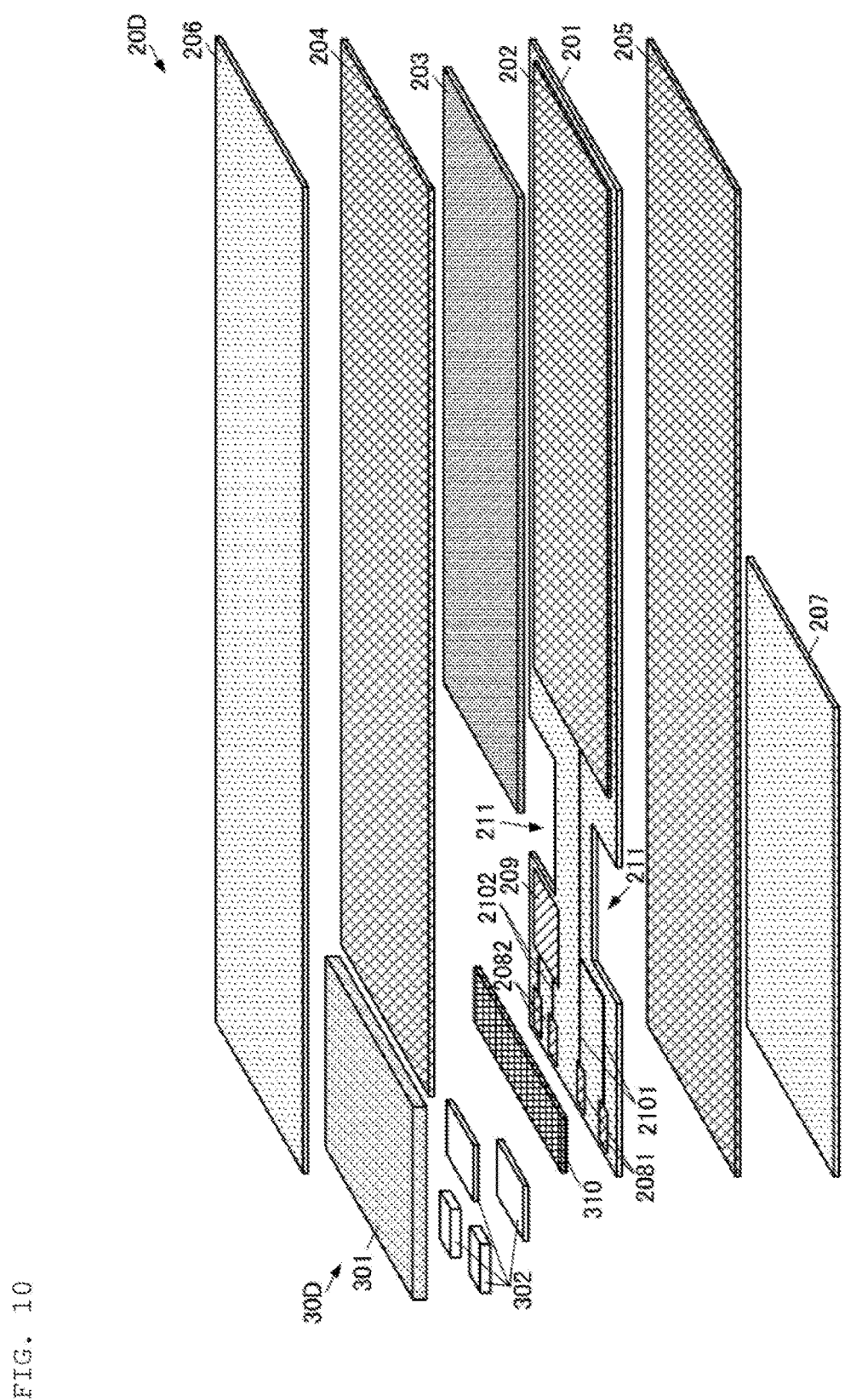
FIG. 10 is an exploded perspective view illustrating a configuration of a piezoelectric sensor and a detecting unit of a holding state detecting device according to a sixth embodiment.
Figure 11:
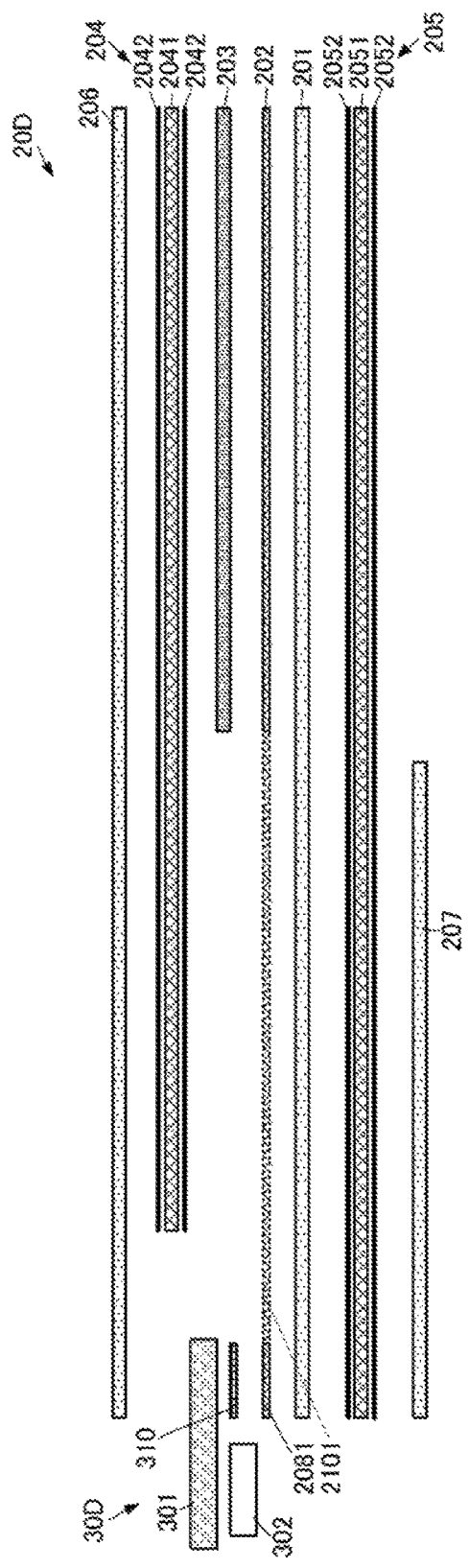
FIG. 11 is a side sectional view illustrating an exploded state of the configuration of the piezoelectric sensor and the detecting unit of the holding state detecting device according to the sixth embodiment.

Next, a holding state detecting device according to a sixth embodiment will be described with reference to the drawings. FIG. 10 is an exploded perspective view illustrating a configuration of a piezoelectric sensor and a detecting unit of the holding state detecting device according to the sixth embodiment. FIG. 11 is a side sectional view illustrating an exploded state of the configuration of the piezoelectric sensor and the detecting unit of the holding state detecting device according to the sixth embodiment.

A holding state detecting device 10D according to the present embodiment includes a piezoelectric sensor 20D and a detecting unit 30D. A function of the piezoelectric sensor 20D is the same as a function of the piezoelectric sensor 20 according to the first embodiment. A function of the detecting unit 30D is the same as that of the detecting unit 30 according to the first embodiment.

The piezoelectric sensor 20D includes a base film 201, a detection conductor 202, a piezoelectric sheet 203, a first ground conductor 204, a second ground conductor 205 and protection films 206 and 207.

The base film 201 has an insulation property and is made of PET, for example. The base film 201 has a rectangular elongated shape when seen from a plan view. The detection conductor 202 is formed on a top surface of the base film 201. The detection conductor 202 is formed in a predetermined range of one end side of the base film 201 in a longitudinal direction. Terminal conductors 2081 and 2082, a ground conductor 209 and wiring conductors 2101 and 2102 are formed on the top surface of the base film 201. The terminal conductors 2081 and 2082 are formed near the other end of the base film 201 in the longitudinal direction. The ground conductor 209 is disposed between the terminal conductor 2082 and the detection conductor 202 in the longitudinal direction of the base film 201. The wiring conductor 2101 connects the terminal conductor 2081 and the detection conductor 202. The wiring conductor 2102 connects the terminal conductor 2082 and the ground conductor 209. Cutouts 211 are formed on the base film 201 between a formation area of the detection conductor 202 and formation areas of the terminal conductors 2081 and 2082 and the ground conductor 209.

The piezoelectric sheet 203 is disposed on a top surface of the detection conductor 202. A planar shape of the piezoelectric sheet 203 is the substantially same as a planar shape of the detection conductor 202.

The first ground conductor 204 is disposed a top surface side of the base film 201. Thus, the piezoelectric sheet 203 is sandwiched between the detection conductor 202 and the first ground conductor 204 in an area at one end side of the first ground conductor 204 in the longitudinal direction. An area at the other end side of the first ground conductor 204 in the longitudinal direction is in contact with the ground conductor 209. In this regard, an insulation film is disposed at a portion at which the first ground conductor 204 and the wiring conductor 2101 overlap. As illustrated in FIG. 11, the first ground conductor 204 is composed of a conductor film 2041, and conductive adhesive members 2042 disposed on both surfaces of the conductor film 2041.

The protection film 206 is disposed at the top surface side of the first ground conductor 204. The protection film 206 is an insulation film and is made of PET, for example. The protection film 206 has the substantially same shape as that of the base film 201.

The second ground conductor 205 is disposed on a top surface of the base film 202. As illustrated in FIG. 11, the second ground conductor 205 is composed of a conductor film 2051, and conductive adhesive members 2052 disposed on both surfaces of the conductor film 2051. The second ground conductor 205 conducts with the first ground conductor 204 via the areas of the cutouts 211.

The protection film 207 is disposed at a back surface side of the second ground conductor 205. The protection film 207 is an insulation film and is made of PET, for example. The protection film 207 is shorter than the base film 201. The protection film 207 overlaps an area at the other end side of the second ground conductor 205 in the longitudinal direction, and does not overlap an area at the other end side.

The detecting unit 30D includes a base substrate 301 and electronic parts 302. According to an exemplary embodiment, the electronic parts 302 can include a computer processing unit ("CPU"), such as a microprocessor, and memory with software code (i.e., processor executable instructions) stored thereon, such that the CPU is configured to execute the algorithms described herein. Moreover, a circuit pattern is formed on the base substrate 301. The electronic parts 302 are mounted on the base substrate 301. External connection terminals of the circuit pattern of the base substrate 301 are connected to the terminal conductors 2081 and 2082 with an anisotropic conductive film 310 interposed therebetween.

Figure 12:
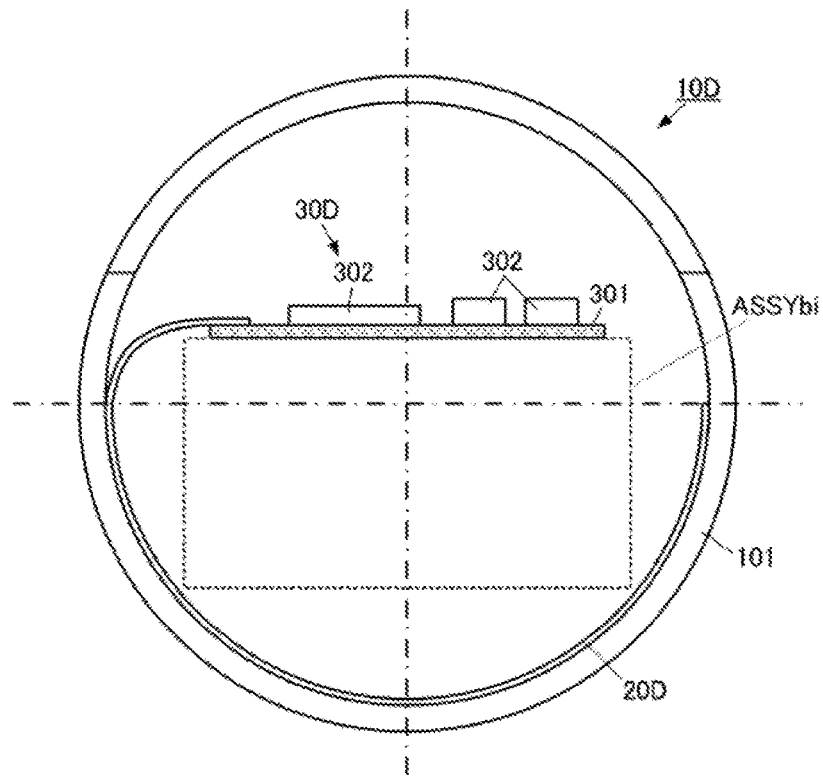
FIG. 12 is a sectional view illustrating a part arrangement state of the holding state detecting device according to the sixth embodiment.

A composite module of the piezoelectric sensor 20D and the detecting unit 30D employing such a configuration is mounted on the housing 101 as illustrated in FIG. 12. FIG. 12 is a sectional view illustrating a part arrangement state of the holding state detecting device according to the sixth embodiment.

The housing 101 has a cylindrical shape, and an electronic part ASSYbi (i.e., an assembly) is mounted in the housing 101. The piezoelectric sensor 20D is disposed along an inner wall surface of the housing 101. A nearly entire surface of the piezoelectric sensor 20D in the longitudinal direction except an end connected with the detecting unit 30D is in contact with the inner wall surface of the housing 101. In this regard, as illustrated in FIGS. 10 and 11, part of the second ground conductor 205 is exposed without being covered by the protection film 207, and therefore the conductive adhesive member 2052 at this exposed portion adheres the piezoelectric sensor 20D to the inner wall surface of the housing 101. Thus, the piezoelectric sensor 20D is fixed to the housing 101.

The end of the piezoelectric sensor 20D in the longitudinal direction at a side of the detecting unit 30D is curved toward an inside of the housing 101. Thus, the detecting unit 30D is disposed at a nearly center of an internal space of the housing 101. The detecting unit 30D is fixed to the electronic part ASSYbi.

By employing such a configuration, it is possible to integrally form the piezoelectric sensor 20D and the detecting unit 30D and dispose the piezoelectric sensor 20D and the detecting unit 30D inside the housing 101.

Figure 13:
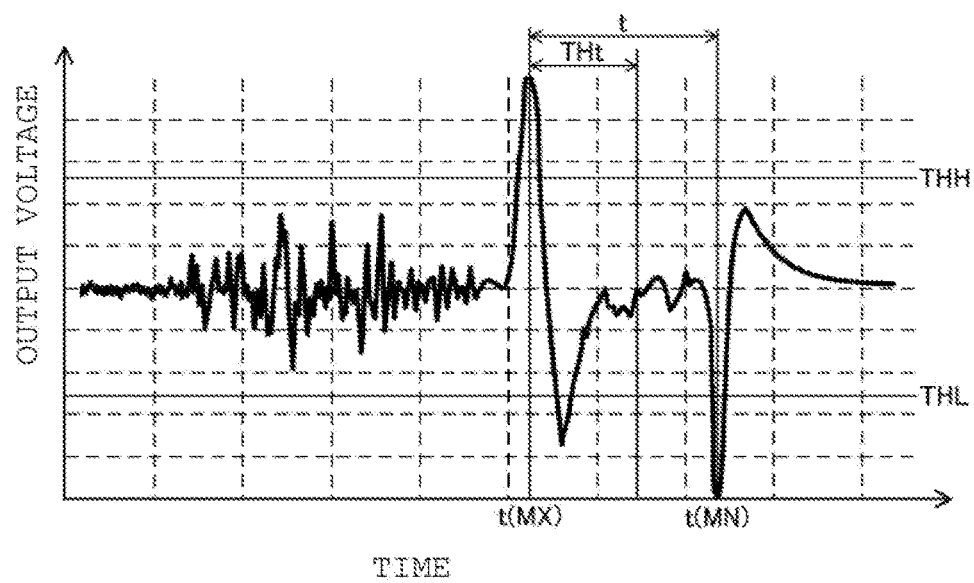
FIG. 13 is a voltage waveform chart for explaining a detection concept of a holding state detecting device according to a seventh embodiment.

Next, a holding state detecting device according to a seventh embodiment will be described with reference to the drawings. FIG. 13 is a voltage waveform chart for explaining a detection concept of the holding state detecting device according to the seventh embodiment.

A structure described in one of the embodiments is used as a structure of the holding state detecting device according to the present embodiment. The holding state detecting device according to the present embodiment differs in an operation executed based on an output voltage of a piezoelectric sensor.

FIG. 13 illustrates an output voltage waveform in a state where a housing is held and then the housing is pressed for a longer period of time. In this regard, the long press refers to a state where a pressing force is continuously applied to the housing from an outside over a predetermined period of time.

As described above, a fluctuation amount of a voltage becomes great in a period in which the housing is held compared to a period in which the housing is not held. Further, when the pressing force is applied to the housing, the voltage significantly fluctuates compared to a state where the housing is simply held. Furthermore, when the housing is pressed for a longer period of time, a voltage value becomes higher than a reference voltage at a start of a press, and the voltage value becomes lower than the reference voltage at an end of the press.

A detecting unit includes memory (not shown) that can store an operation detection high voltage threshold THH, and a low voltage threshold THL in advance. The high voltage threshold THH is set higher than a voltage value in a simple holding state. The high voltage threshold THH is set such that an output voltage exceeds the high voltage threshold THH when a pressing force is intentionally applied. The low voltage threshold THL is set lower than a voltage value in the simple holding state. The high voltage threshold THH is an operation control threshold and a first operation control threshold according to the present invention. The low voltage threshold THL is set such that the output voltage goes below the low voltage threshold THL when a long pressing force is intentionally applied and a pressing force is released. The low voltage threshold THL is a second operation control threshold according to the present invention.

Figure 14:
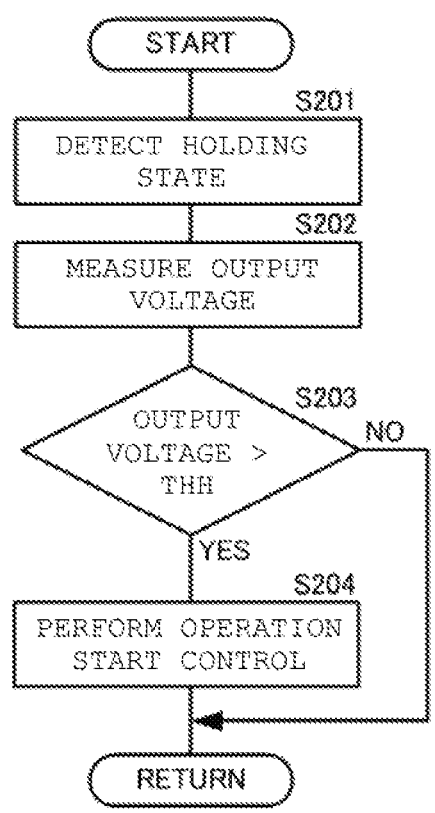
FIG. 14 is a flowchart illustrating a first operation input detection flow of the detecting unit of the holding state detecting device according to the present embodiment.

FIG. 14 is a flowchart illustrating a first operation input detection flow of the detecting unit of the holding state detecting device according to the present embodiment.

The detecting unit detects a holding state by using a method according to the above embodiments (S201). The detecting unit temporally measures an output voltage (S202). The detecting unit successively compares the output voltage and the high voltage threshold THH, and performs operation start control (S204) when detecting that the output voltage becomes higher than the high voltage threshold THH (S203: YES). The operation start control is control to start a preset operation, and is, for example, control to start an operation of, in a case of an electronic writing tool, changing a thickness of a line to be drawn and changing a color of a line to be drawn. Further, when a plurality of operation modes is set in advance, it is also possible to switch a mode by performing the operation start control.

In this regard, when the output voltage is equal to or less than the high voltage threshold THH (S203: NO), the detecting unit continues measuring the output voltage and comparing the output voltage and the high voltage threshold THH.

By performing such processing, it is possible to not only simply detect a holding state but also detect an input of another operation performed by an intentional long pressing force in a holding state, and perform this operation control. In this regard, a switch and an operator which execute another operation are not additionally necessary.

Figure 15:
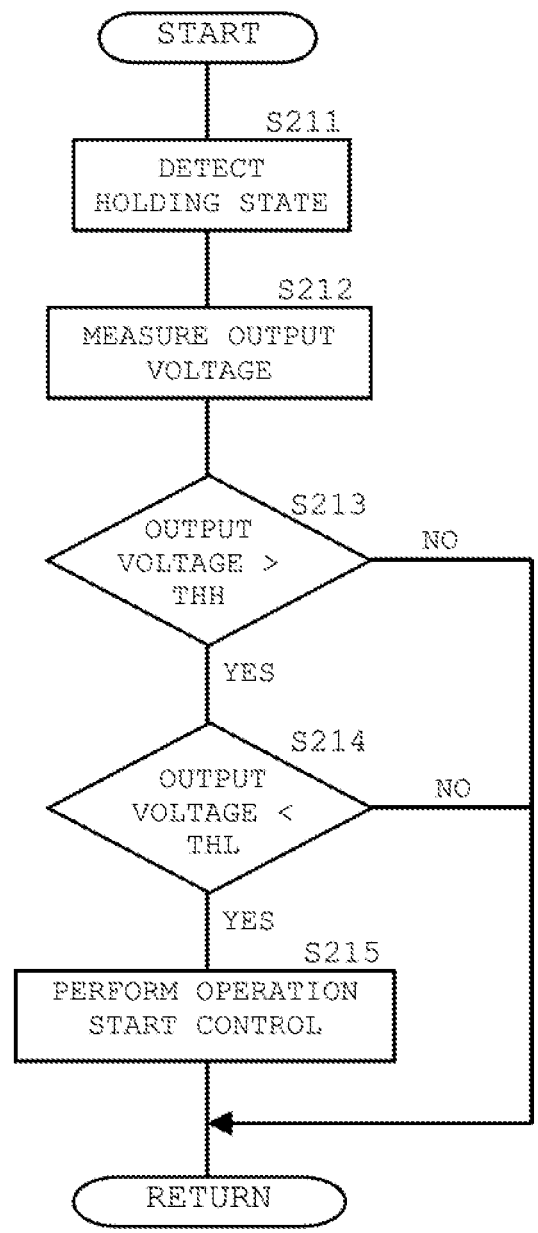
FIG. 15 is a flowchart illustrating a second operation input detection flow of the detecting unit of the holding state detecting device according to the present embodiment.

FIG. 15 is a flowchart illustrating a second operation input detection flow of the detecting unit of the holding state detecting device according to the present embodiment.

The detecting unit detects a holding state by using a method according to the above embodiments (S211). The detecting unit temporally measures an output voltage (S212). The detecting unit successively compares the output voltage and the high voltage threshold THH, and stores the output voltage and the high voltage threshold THH when detecting that the output voltage becomes higher than the high voltage threshold THH (S213: YES). Next, the detecting unit successively compares the output voltage and the low voltage threshold THL, and performs operation start control (S215) when detecting that the output voltage becomes lower than the low voltage threshold THL (S214: YES).

In this regard, when the output voltage is equal to or less than the high voltage threshold THH (S213: NO) and when the output voltage is equal to or more than the low voltage threshold THL (S214: NO), the detecting unit continues measuring the output voltage and comparing the output voltage, and the high voltage threshold THH and the low voltage threshold THL.

By performing such processing, it is possible to not only simply detect a holding state but also detect an input of another operation performed by an intentional long pressing force in a holding state, and perform this operation control. In this regard, a switch and an operator which execute another operation are not additionally necessary.

Figure 16:
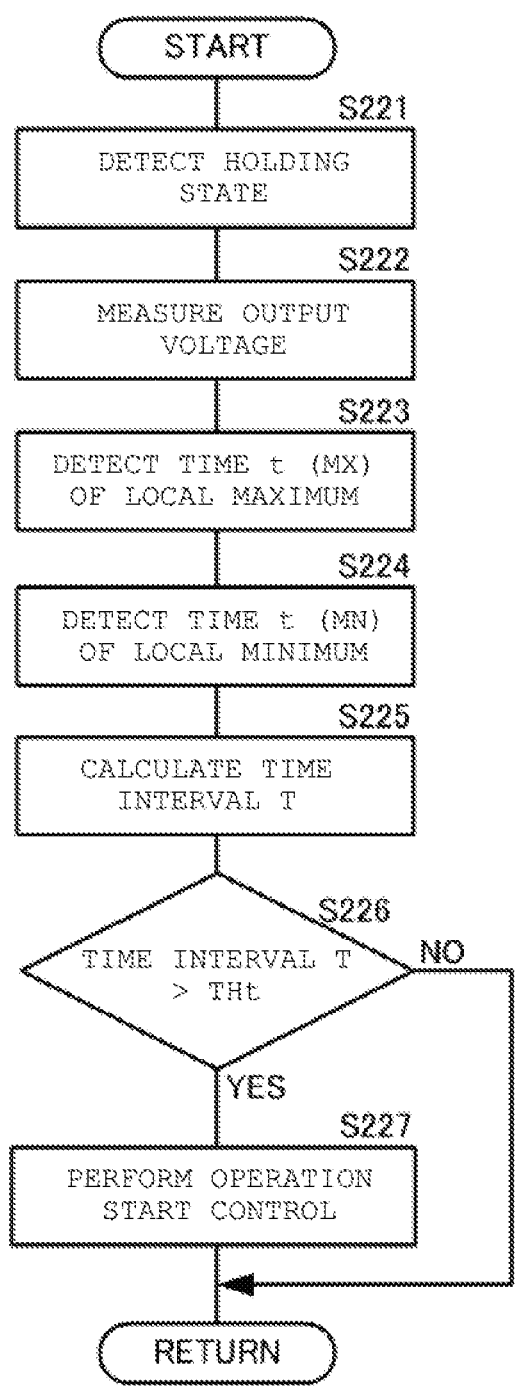
FIG. 16 is a flowchart illustrating a third operation input detection flow of the detecting unit of the holding state detecting device according to the present embodiment.

In this regard, the above method is an aspect where a long pressing force is detected based on an output voltage value. However, it is also possible to detect a long press based on a time. FIG. 16 is a flowchart illustrating a third operation input detection flow of the detecting unit of the holding state detecting device according to the present embodiment.

The detecting unit detects a holding state by using a method according to the above embodiments (S221). The detecting unit temporally measures an output voltage (S222). The detecting unit detects a peak of the output voltage, and detects a time t (MX) of a local maximum (S223). The detecting unit detects the local maximum, subsequently detects a peak of the output voltage, and detects a time t (MN) of a local minimum (S224).

When a long pressing force is performed by an operator, as described above, a voltage becomes higher than a reference voltage and maximal at a start of a press, and the voltage becomes lower than the reference voltage and minimal at an end of the press. Hence, a difference between the time of the local maximum and the time of the local minimum is proportional to a time during which a pressing force is applied.

The detecting unit calculates a time interval T between the time t (MX) of the local maximum and the time t (MN) of the local minimum (S225). The detecting unit stores a long press detection threshold time THt in advance. The long press detection threshold time THt can be considered an operation control time threshold according to an exemplary embodiment. The detecting unit compares the time interval T and the threshold time THt, and performs operation start control (S227) when detecting that the time interval T is longer than the threshold time THt (S228: YES).

In this regard, when the time interval T is not longer than the threshold time THt (S226: NO), the detecting unit continues measuring the output voltage and comparing the time interval T and the threshold time THt.

In this regard, FIG. 16 illustrates an aspect where a local maximum and a local minimum are used. However, a time at which an output voltage exceeds a press detection threshold may be used to calculate a time interval.

Even such processing makes it possible to not only simply detect a holding state but also detect an input of another operation performed by an intentional long pressing force in a holding state.

In this regard, detection of a single press and detection of a long press described above can be combined and executed. Consequently, it is possible to start controlling a plurality of operations without using a dedicated switch.

Figure 17:
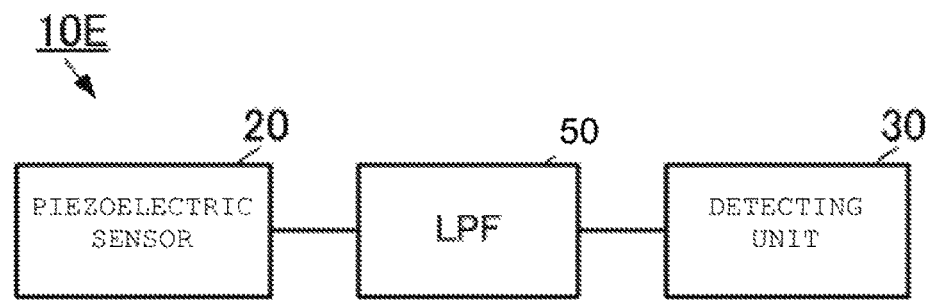
FIG. 17 is a functional block diagram of a holding state detecting device according to an eighth embodiment.

Next, a holding state detecting device according to an eighth embodiment will be described with reference to the drawings. FIG. 17 is a functional block diagram of the holding state detecting device according to the eighth embodiment.

A holding state detecting device 10E according to the present embodiment differs from holding state detecting devices according to the above embodiments in additionally including a low-pass filter 50. Other components are the same as those of the holding state detecting devices according to the embodiments.

The low-pass filter 50 is connected between a piezoelectric sensor 20 and a detecting unit 30. The low-pass filter 50 has cutoff frequency of approximately 100 [kHz].

A frequency of a displacement of a piezoelectric sensor produced by a press of a person is several [Hz] to several tens of [Hz]. Meanwhile, a frequency of a vibration and a shock from an outside is several hundreds of [Hz] to several thousands of [Hz]. Hence, by using this low-pass filter 50, the detecting unit 30 receives an input of only an output signal of a frequency deriving caused by a displacement due to a press.

Consequently, it is possible to more accurately detect a holding state and a press.

In the above embodiments, an aspect where a housing has a cylindrical shape, i.e., an aspect where a holding state detecting device is an electronic writing tool has been described. The holding state detecting device is applicable to housings of ether shapes such as a mouse, a tablet terminal and a mobile telephone. In this regard, equipment to which the holding state detecting device according to the present invention is attached is preferably equipment which an operator uses by gripping part of the holding state detecting device. Part of various aspects will be described below.

Figure 18:
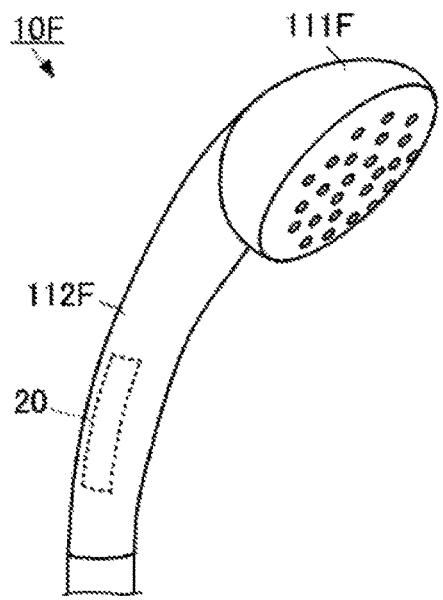
FIG. 18 is an external appearance perspective view of a holding state detecting device according to a ninth embodiment.

A holding state detecting device according to a ninth embodiment will be described with reference to the drawings. FIG. 18 is an external appearance perspective view of the holding state detecting device according to the ninth embodiment.

A holding state detecting device 10F is a shower device. The holding state detecting device 10F includes a shower head 111F and a grip portion 112F. The grip portion 112F has a cylindrical shape, and is physically connected to the shower head 111F. A piezoelectric sensor 20 is attached to the grip portion 112F. The piezoelectric sensor 20 may be disposed near an inner surface of the grip portion 112F or may be attached to the surface. In this regard, when being attached to the surface, the piezoelectric sensor 20 is covered by a waterproof film or the like.

When a user grips the grip portion 112F, the piezoelectric sensor 20 and a detecting unit 30 (not illustrated) detect a gripping state (holding state). Detection of this gripping state triggers supplying water or hot water to the shower head 111F. In this case, by enabling detection of a pressing force or a long press as described above, it is also possible to perform control to adjust a water amount (hot water amount), adjust a water temperature and stop supplying water by using the pressing force or a long press time.

In this regard, PLLA has low temperature dependency of piezoelectric characteristics as described above, and is more effective in such an aspect.

Figure 19:
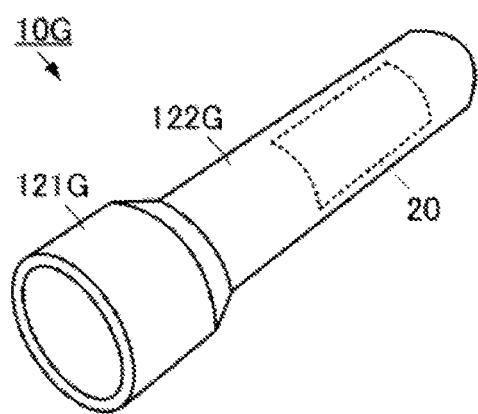
FIG. 19 is an external appearance perspective view of a holding state detecting device according to a tenth embodiment.

A holding state detecting device according to a tenth embodiment will be described with reference to the drawings. FIG. 19 is an external appearance perspective view of the holding state detecting device according to the tenth embodiment.

A holding state detecting device 10G is a flashlight. The holding state detecting device 10G includes a light portion 121G and a grip portion 122G. The grip portion 122G has a cylindrical shape, and is physically connected to the light portion 121G. A piezoelectric sensor 20 is attached to the grip portion 122G. The piezoelectric sensor 20 may be disposed near an inner surface of the grip portion 122G or may be attached to the surface.

When a user grips the grip portion 122G, the piezoelectric sensor 20 and a detecting unit 30 (not illustrated) detect a gripping state (holding state). Detection of this gripping state triggers turning on the light portion 121G. In this case, by enabling detection of a pressing force or a long press as described above, it is also possible to perform control to adjust light or turn off the flashlight by using the pressing force or a long press time.

Figure 20:
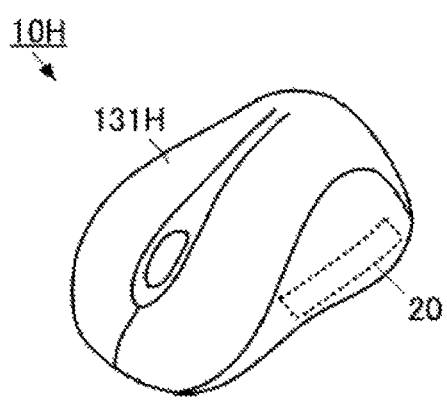
FIG. 20 is an external appearance perspective view of a holding state detecting device according to an eleventh embodiment.

A holding state detecting device according to an eleventh embodiment will be described with reference to the drawings. FIG. 20 is an external appearance perspective view of the holding state detecting device according to the eleventh embodiment.

A holding state detecting device 10B is a wireless mouse for a computer. The holding state detecting device 10H includes a housing 131H. The housing 131H has a shape formed by cutting an ellipsoid spherical body into half. A piezoelectric sensor 20 is attached to the housing 131H. The piezoelectric sensor 20 may be disposed near an inner surface of the housing 131H or may be attached to the surface. In this case, the piezoelectric sensor 20 is disposed in an area which is not used for normal click processing, and is disposed at a position to which a pressing force is applied when a user grips the piezoelectric sensor 20.

When the user grips the housing 131H, the pie isoelectric sensor 20 and a detecting unit 30 (not illustrated) detect a gripping state (holding state). Detection of this gripping state triggers turning on a power supply of a mouse. By contrast with this, when it is detected that the grip is released, detection of this grip release state triggers turning off the power supply of the mouse. In this case, by enabling detection of a pressing force or a long press as described above, it is also possible to perform various types of other control (function control).

In this regard, a wireless mouse for a computer has been described as an example. However, the holding state detecting device is applicable to devices such as wireless controllers of board games and mobile game machines which are driven by batteries.

Figure 21:
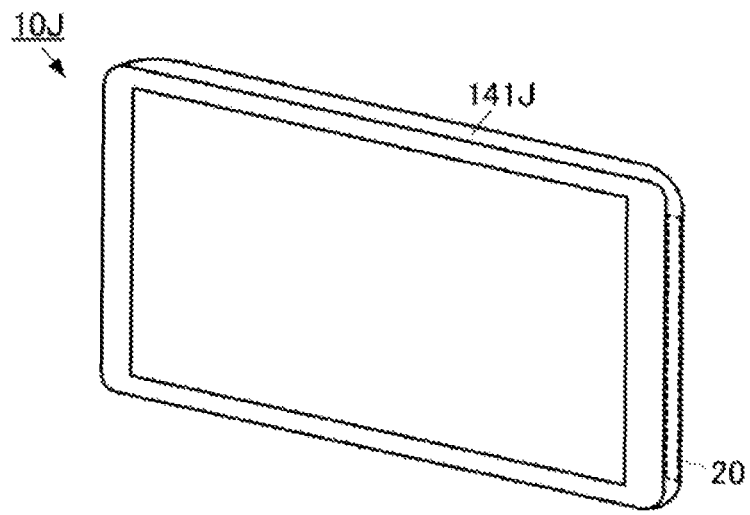
FIG. 21 is an external appearance perspective view of a holding state detecting device according to a twelfth embodiment.

A holding state detecting device according to a twelfth embodiment will be described with reference to the drawings. FIG. 21 is an external appearance perspective view of the holding state detecting device according to the twelfth embodiment.

A holding state detecting device 10J is a tablet terminal. The holding state detecting device 10J includes a housing 141J. The housing 141J has a flat plate shape. A piezoelectric sensor 20 is attached to the housing 141J. The piesoelectric sensor 20 may be disposed near an inner surface of the housing 141J or may be attached to the surface. In this case, the piezoelectric sensor 20 may be disposed at a position of the tablet terminal which a user grips.

When the user grips the housing 141J, the piezoelectric sensor 20 and a detecting unit 30 (not illustrated) detect a gripping state (holding state). Detection of this gripping state triggers turning on image display of a display. By contrast with this, when it is detected that the grip is released, detection of this grip release state triggers turning off the image display of the display. Consequently, it is possible to suppress unnecessary power consumption of a battery of the tablet terminal. Further, by enabling detection of a pressing force or a long press as described above, it is also possible to perform various other types of control (specific operation input control and the like).

Figure 22:
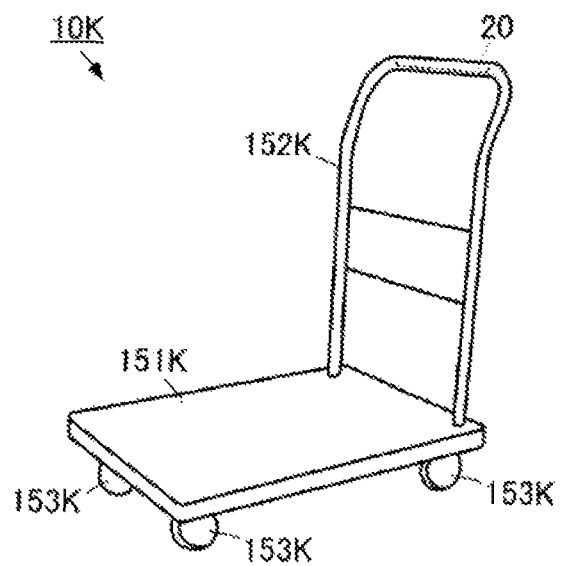
FIG. 22 is an external appearance perspective view of a holding state detecting device according to a thirteenth embodiment.

A holding state detecting device according to a thirteenth embodiment will be described with reference to the drawings. FIG. 22 is an external appearance perspective view of the holding state detecting device according to the thirteenth embodiment.

A holding state detecting device 10K is a dolly. The holding state detecting device 10K includes a base portion 151K, a grip portion (arm) 152K and wheels 153K.

The grip portion 152E has a cylindrical shape, and is physically connected to the base portion 151K.

A piezoelectric sensor 20 is attached to the grip portion 152K. The piezoelectric sensor 20 may be disposed near an inner surface of the grip portion 152K or may be attached to the surface.

When a user grips the grip portion 152K, the piezoelectric sensor 20 and a detecting unit 30 (not illustrated) detect a gripping state (holding state). Detection of this gripping state can trigger releasing braking applied to the wheels 153K. By contrast with this, when it is detected that the grip is released, detection of this grip release state triggers applying a brake to the wheels. Consequently, when there is no user, it is possible to prevent the dolly from unintentionally moving, and release the brake without using a switch for releasing the brake.

Further, by enabling detection of a pressing force or a long press as described above, it is also possible to control an effect of braking by using the pressing force or a long press time. Consequently, it is possible to adjust the effect of braking according to a use status. It is possible to perform adjustment of optionally increasing the effect of braking when, for example, the dolly goes down a slope.

In this regard, an example where a piezoelectric film made of polylactic acid is used for a piezoelectric sensor has been described in the above embodiments. However, other piezoelectric films such as PVDF can be also used according to a status. In this regard, by using polylactic acid, it is possible to realize the reliable holding state detecting device without pyroelectricity as described above. Further, the piezoelectric sensor made of polylactic acid and the piezoelectric sensor made of PVDF or the like and having pyroelectricity may be combined. Consequently, it is possible to more accurately detect a hold by a person. Further, piezoelectric ceramics can foe also used for the piezoelectric sensor. However, by using the piezoelectric film made of highly flexible polylactic acid for the piezoelectric sensor, it is easy to dispose the piezoelectric sensor in a housing, and it is possible to improve reliability since a damage hardly occurs.

Further, the aspect where the piezoelectric sensor which detects a press applied to the housing is used has been described in the above embodiments. However, it is also possible to use a piezoelectric sensor which detects a myoelectric signal. In this case, it is possible to detect a myoelectric signal produced during a grip without applying a press and detect a holding state, and, consequently, it is also possible to detect a holding state for a more natural operation.

DESCRIPTION OF REFERENCE SYMBOLS 10, 10A, 10B, 10C, 10D, 10E, 10F, 10G, 10H, 10J, 10K: Holding State Detecting Device
20, 20A, 20B, 20C, 20D: Piezoelectric Sensor
30, 30D: Detecting Unit
40: Attachment Member
50: Low-Pass Filter
101: Housing
102: Tapered End
111F: Shower Head
112F: Grip Portion
121G: Light Portion
122G: Grip Portion
131H, 141J: Housing
151K: Base Portion
152K: Grip Portion (Arm)
153K: Wheel
201: Base Film
202: Detection Conductor
203: Piezoelectric Sheet
204: First Ground Conductor
205: Second Ground Conductor
206, 207: Protection Film
301: Base Substrate
302: ELECTRONIC PART
2041, 2051: CONDUCTOR FILM
2042, 2052: CONDUCTIVE ADHESIVE MEMBER

The invention claimed is:

1. A device for detecting a holding state of an object, the device comprising:
    a housing for the object having a shape adapted to be held by an operator;
    a piezoelectric sensor attached to the housing and configured to generate an output voltage; and
    a detecting unit communicatively coupled to the piezoelectric sensor and configured to detect a holding state of the object based on a fluctuation amount of the output voltage generated by the piezoelectric sensor,
    wherein the detecting unit is configured to determine that the object is being held by the operator when the fluctuation amount is larger than a preset hold detection threshold, and
    wherein the detecting unit is further configured to:
        detect a first time when the output voltage is a maximum value,
        detect a second time when the output voltage is a minimum value,
        calculate a time interval between the first and second times,
        determine if the calculated time interval is longer than an operation control time threshold, and
        start an operation executed by the object if the time interval is longer than the operation control time threshold.

2. The device according to claim 1, wherein the piezoelectric sensor includes:
    a piezoelectric film having a flat film shape; and
    a conductor film that extracts a charge produced by the piezoelectric film when the piezoelectric film is stretched and contracts.

3. The device according to claim 2, wherein the output voltage generated by the piezoelectric sensor is based on the extracted charge.

4. The device according to claim 2, wherein the piezoelectric film comprises polylactic acid as a main component and is stretched in a uniaxial direction when the operator holds the housing.

5. The device according to claim 1,
    wherein the housing has either a cylindrical shape or a box shape, and
    the piezoelectric sensor is attached to an inner wall surface of the housing.

6. The device according to claim 5, wherein the piezoelectric sensor includes:
    a base film;
    a detection conductor disposed on the base film;

a piezoelectric sheet disposed on the detection conductor;
a first ground electrode disposed on the piezoelectric sheet;
a second ground electrode disposed on the base film opposite the detection conductor; and
a pair of protection films disposed on the first and second ground electrodes, respectively.

7. The device according to claim 6, wherein the detecting unit includes a base substrate and electronic components coupled to the detection conductor by terminal conductors and wiring conductors disposed on the base film.

8. The device according to claim 1, further comprising a low-pass filter disposed between the piezoelectric sensor and the detecting unit and having a cutoff frequency adapted to cut of signals having a frequency indicative of at least one of vibration and shock applied to the object.

9. A device for detecting a holding state of an object, the device comprising:
a housing for the object having a shape adapted to be held by an operator;
a piezoelectric sensor attached to an inner wall surface of the housing and configured to generate an output voltage; and
a detecting unit communicatively coupled to the piezoelectric sensor and configured to detect a holding state of the object based on a fluctuation amount of the output voltage generated by the piezoelectric sensor,
wherein the piezoelectric sensor includes:
a base film;
a detection conductor disposed on the base film;
a piezoelectric sheet disposed on the detection conductor;
a first ground electrode disposed on the piezoelectric sheet;
a second ground electrode disposed on the base film opposite the detection conductor; and
a pair of protection films disposed on the first and second ground electrodes, respectively, with the protection film disposed on the second ground electrode having a shorter length than the second ground electrode, such that the second ground electrode is secured to the inner wall surface of the housing by a conductive adhesive member.

10. The device according to claim 9, wherein the detecting unit determines that the object is being held by the operator when the fluctuation amount is larger than a preset hold detection threshold.

11. The device according to claim 10, wherein the detecting unit further determines that the object has been released by the operator when the fluctuation amount becomes smaller than the preset hold detection threshold after the fluctuation amount was determined to be larger than the preset hold detection threshold.

12. The device according to claim 10, wherein the detecting unit is configured to start an operation executed by the object when the detecting unit determines that the output voltage is larger than a preset operation control threshold.

13. The device according to claim 10, wherein the detecting unit is configured to start an operation executed by the object when the detecting unit determines that the output voltage is larger than a preset first operation control threshold and then the detecting unit determines that the output voltage is smaller than a preset second operation control threshold.

14. The device according to claim 10, wherein the detecting unit is further configured to:
detect a first time when the output voltage is a maximum value,
detect a second time when the output voltage is a minimum value,
calculate a time interval between the first and second times,
determine if the time interval is longer than an operation control time threshold, and
start an operation executed by the object if the time interval is longer than the operation control time threshold.

15. A method for detecting a holding state of an object having a housing adapted to be held by an operator, the method comprising:
generating, by a piezoelectric sensor attached to the housing, an output voltage;
detecting, by a detecting unit coupled to the piezoelectric sensor, a holding state of the object based on a fluctuation amount of the output voltage generated by the piezoelectric sensor;
determining, by the detecting unit, that the object is being held by the operator when the fluctuation amount is larger than a preset hold detection threshold;
detecting, by the detecting unit, a first time when the output voltage is a maximum value;
detecting, by the detecting unit, a second time when the output voltage is a minimum value;
calculating, by the detecting unit, a time interval between the first and second times;
determining, by the detecting unit, if the time interval is longer than an operation control time threshold; and
starting, by the detecting unit, an operation executed by the object if the time interval is longer than the operation control time threshold.

16. The method according to claim 15, further comprising determining, by the detecting unit, that the object has been released by the operator when the fluctuation amount becomes smaller than the preset hold detection threshold after the fluctuation amount was determined to be larger than the preset hold detection threshold.

17. The method according to claim 15, further comprising starting, by the detecting unit, an operation executed by the object when the output voltage is larger than a preset operation control threshold.

18. The method according to claim 15, further comprising starting, by the detecting unit, an operation executed by the object when the output voltage is larger than a preset first operation control threshold and then the output voltage is smaller than a preset second operation control threshold.

* * * * *